United States Patent Office 3,684,683
Patented Aug. 15, 1972

3,684,683
ELECTROPHORETIC LIGHT IMAGE REPRODUCTION DEVICE
Isao Ota, Osaka-shi, Japan, assignor to Matsushita Electric Industrial Co., Ltd., Osaka, Japan
Filed Apr. 13, 1970, Ser. No. 27,474
Int. Cl. B01k 5/02; C23b 13/00
U.S. Cl. 204—300
16 Claims

ABSTRACT OF THE DISCLOSURE

Electrophoretic light image display and/or recording device is disclosed in which an electrophoretic suspension layer is interposed between two electrodes one of which has a photoconductive layer coupled thereto and faced to said electrophoretic suspension layer, said electrophoretic suspension layer including a dispersion of at least one electrophoretic material in a finely divided powder form suspended in a suspending medium so that optical reflective property of said electrophoretic suspension layer changes with electrophoretic movement of said electrophoretic material upon application of an electric field. A light image is projected on said photoconductive layer so as to reduce the resistivity thereof, and an electric field is applied between said two electrodes during the reduction of the resistivity of said photoconductive layer, whereby a visible image is reproduced on said electrophoretic suspension layer.

BACKGROUND OF THE INVENTION

Many systems are known today for displaying or recording a light image. For example, a double layer of a photoconductive layer and an electroluminescent layer can be used so as to produce an electric flat panel display device for displaying light mage reversibily. But this device suffers from one shortcoming or another. For example, the device can not display a sufficiently bright image due to the shortcoming of the luminescent efficiency of the electroluminescent layer. It can not store or record the displayed image. An electron tube such as image tube, Noctovision or X-ray image intensifier is known as a device for converting input infrared light image or X-ray image into a visible image or for amplifying an input dark image into a bright image but it is difficult to produce a flat panel or to enlarge the size.

In order to record an input light image, photographic systems such as, for example, silver salt photography, electro-photography or diazo photography are today in wide spread use but those systems suffer from ane shortcoming or another in cost, process time, photographic speed or spectral sensitivity.

SUMMARY OF THE INVENTION

An object of this invention is to provide a light image display and/or recording device which comprises a photoconductive layer and an electrophoretic suspension layer.

An additional objective of this invention is to provide an image converter capable of converting an invisible image into a visible image or a negative image into positive image. Still another objective of this invention is to provide a light image reproduction device capable of producing a visible image in one step.

Still another objective of this invention is to provide a large and/or flat panel for an image reproduction.

Other objects and advantages of this invention will be apparent from the following description, the accompanying drawings and appended claims.

The size and shapes of elements of the drawings should not be considered as actual sizes or even proportional to actual sizes because many elements have been purposely distorted in size or shape in order to more fully and clearly describe the invention.

An electrophoretic light image display and/or recording device according to the present invention comprises an electrophoretic suspension layer inserted between two electrodes one of which has a photoconductive layer coupled thereto and faced to said electrophoretic suspension layer, said electrophoretic suspension layer including a dispersion of at least one electrophoretic material in a finely divided powder form suspended in a suspending medium so that an optical reflective property of the electrophoretic suspension layer changes with variation in a spatial distribution of the electrophoretic material in the suspending medium due to electrophoretic movement thereof upon application of a D.C. electric field. A light image is projected on said photoconductive layer so as to reduce the resistivity thereof, and a D.C. electric field is applied between said two electrodes during the reduction of the resistivity of said photoconductive layer, whereby a visible image is reproduced on said electrophoretic suspension layer.

Figure 1:
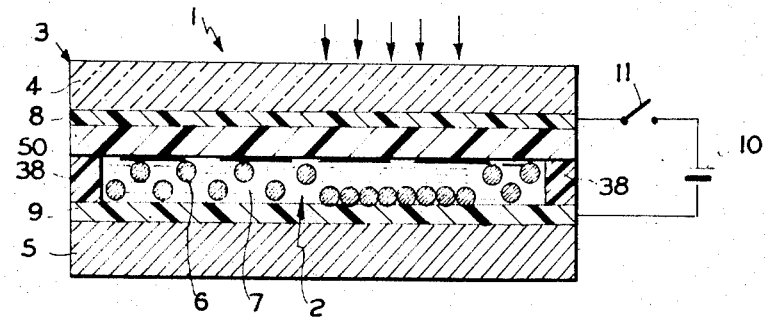
FIG. 1 is a cross sectional view of a light image reproduction panel in accordance with this invention.

Referring to FIG. 1, reference character 1 designates, as a whole, an electrophoretic light image reproduction panel of this invention. A housing 3 has two opposite major housing walls 4 and 5. One of two housing walls, for example, a housing wall 4 is transparent with respect to light image and another housing wall 5 is transparent with respect to visible light. Two electrodes 8 and 9 are adhered to the inner surfaces of said two opposite major housing walls 4 and 5. One of said two electrodes 8 and 9, for example, electrode 8 is transparent with respect to light image and has a photoconductive layer 50 coupled thereto. Another electrode 9 is transparent with respect to visible light. An electrophoretic suspension layer 2 is enclosed in said housing 3 so as to be in contact with another electrode 9 and said photoconductive layer 50. Said two electrodes 8 and 9 can have an electric field applied therebetween from a voltage source 10 through a switching device 11. Said electrophoretic suspension layer 2 includes a dispersion of at least one electrophoretic material 6 in a finely divided powder form suspended in a suspending medium 7. The particles of the material 6 are shown greatly enlarged in this and subsequent figures for clarity of illustration. When said photoconductive layer 50 is exposed to a light image (represented by the arrows), the photoconductive layer 50 has a reduced resistivity at the exposed area. When a D.C. electric field is applied across said two electrodes 8 and 9 during the reduction of resistivity of said photoconductive layer 50, said electrophoretic material 6 corresponding to said said light image moves electrophoretically toward an electrode 8 or an electrode 9 depending upon the polarities of said electrophoretic material 6 and the applied electric field. When said electrophoretic material 6 is, for example, positively charged in said suspending medium 7 and said two electrodes 8 and 9 are an anode and a cathode, respectively, the electrophoretic material 6 moves electrophoretically to and is deposited on electrode 9 and shows a spatial distribution in accordance with the light image as shown in FIG. 1. Variation in the spatial distribution of said electrophoretic material 6 results in a change of the optical reflective property of said electrophoretic suspension layer 2 and reproduces a visible image corresponding to the light image at the electrode 9 under illumination of visible light.

When said electrophoretic material 6 is, for example, white and said suspending medium 7 is colored, for example, black, a white positive image reproduced at the electrode 9 can be seen under illumination of white light. If polarities of the applied voltage are reversed in the foregoing operation, a black negative image is reproduced at the electrode 9.

Thus, whether a positive or negative image is reproduced at the electrode 9 side can be easily selected by selecting the polarities of the applied D.C. voltage.

The change of the optical reflective property of the suspension layer 2 depends upon the length of time and the strength of the electric field applied thereto. The field strength in the suspension layer depends upon light strength projected on the photoconductive layer 50. The electrophoretic material 6 corresponding to an area of said photoconductive layer 50 exposed to strong light is selectively subjected to a strong electric field and moves toward an electrode faster than the other electrophoretic material. The electrophoretic movement of the electrophoretic material 6 causes a color change of the suspension layer 2 dependent upon the movement of the electrophoretic material 6. In other words, the display and/or recording device 1 of the present invention can reproduce an image having a halftone. The halftone consists of a color which is a mixture of the colors of the material 6 and the suspending medium 7. The length of time of the D.C. voltage application between said two electrodes during image-wise reduction of resistivity of the photoconductive layer controls the density and contrast of the image to be reproduced. It should be controlled depending upon the property of the device and image property required. The electrophoretic material deposited on an electrode or a photoconductvie layer by electrophoresis will remain even after removal of the applied electric field. This means that a display device of the present invention can memorize the reproduced image without using further electric power.

The reproduced image viewed on the electrode 9 can be easily erased, for example, by applying a D.C. or an A.C. voltage between said two electrodes 8 and 9 from a voltage source 10 while said photoconductive layer 50 is being exposed, at the whole surface to the light, and the device 1 can be reused. When a high D.C. or A.C. voltage is applied between said two electrodes 8 and 9 so as to erase the reproduced image, it is not always necessary to expose the photoconductive layer to light during application of said voltage for erasure.

A housing 3 for use in the device according to the present invention can be prepared by using any available material which is inert to the suspending medium and electrophoretic material. For example, a plastic sheet having a major center part cut off can be used for the frame 38 of the housing 3 as shown in FIG. 1.

One of opposite major housing walls can be prepared by adhering, to the frame 38, a visible light transparent plate 5 having a visible light transparent electrode 9 formed thereon. An operable plate is a transparent glass plate having a transparent thin film of tin oxide ($SnO_2$) or cuprous iodine (CuI) formed thereon or a transparent plastic sheet such as polyester, cellulose acetate, cellophane or polyethylene having a transparent thin film of cuprous iodide (CuI) thereon. The other of the two opposite major housing walls can be prepared by adhering, to the frame 38, a light transparent plate 4 having a light transparent electrode 8 and a photoconductive layer 50 integrated thereon. An operable plate is a light transparent glass plate or plastic sheet as described above having a light transparent thin film of tin oxide ($SnO_2$) or cuprous iodine (CuI) and a photoconductive layer 50 thereon.

Said photoconductive layer 50 can be composed of any suitable and available photoconductive material which has an electrical resistance varying with irradiation of light.

Photoconductive material which will be operable is selenium, cadmium sulfide, cadmium selenide, zinc oxide, lead oxide, antimony trisulfide, anthracene, poly-N-vinylcarbazol and its derivatives. It is possible for said photoconductive layer 50 to be crystal plate, vacuum evaporated layer, sintered layer, organic photoconductive coating or dispersion layer including photoconductive material powders dispersed in glass or resin.

The light referred to herein is defined as visible light, infrared light, ultraviolet light, X-ray or $\gamma$-ray. When the input light image is invisible, the image reproduction device of the present invention can act as an image converter.

It is preferable that said photoconductive layer 50 has an electrical resistance higher than that of the electrophoretic suspension layer 2 under irradiation of no light and lower than that of the electrophoretic suspension layer 2 under irradiation of strong light.

The suspending medium 7 can be prepared so as to have the desired color by dissolving a colored substance such as a dye in a colorless liquid or by suspending electrically neutral colored particles such as dyes or pigments in a colorless liquid. For example, deep blue colored suspending medium can be prepared by dissolving oil black dyes in ethyl acetate or kerosene. Violet, brown or green colored suspending medium can be prepared by dissolving cobalt naphthenate, manganese naphthenate or nickel naphthenate in trichlorotrifluoroethane, respectively.

Figure 2:
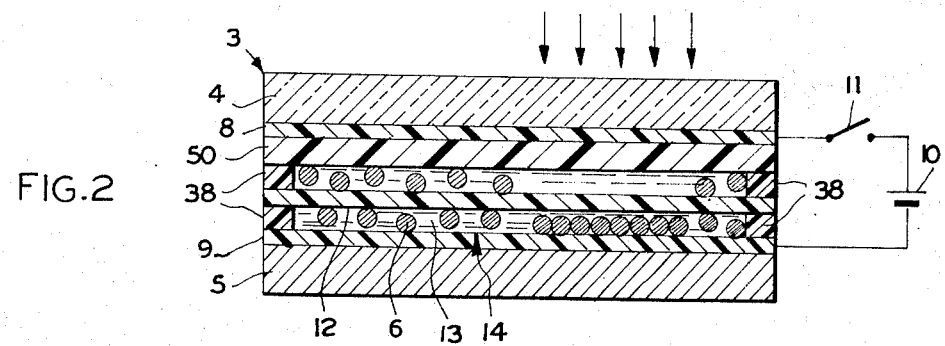
FIGS. 2–4 are cross sectional views of other embodiments of this invention.

Referring to FIG. 2, wherein similar reference characters designate components similar to those of FIG. 1, and electrophoretic suspension layer 14 consists of a dispersion of at least one electrophoretic material 6 suspended in a colorless suspending medium 13 having a colored porous layer 12 inserted therein. In the device of FIG. 2, a mixed color of the electrophoretic material 6 and the colored porous layer 12 can be seen from the transparent electrode 9 before an effective D.C. eletric field is applied across the electrodes 8 and 9. When the colored porous layer 12 is, for example, black, the device shows a gray mixed color at the electrode 9 under illumination of white light.

When a D.C. electric field is applied across the both electrodes 8 and 9 during reduction of resistivity of said photoconductive layer 50 due to irradiation of a light image, the electrophoretic material 6 corresponding to the light image is caused to pass through the colored porous layer 12 and is deposited on an electrode 9 or on the surface of the photoconductive layer 50, for example, on electrode 9, depending upon the polarities of the electrophoretic material 6 and the applied electric field, as shown in FIG. 2. When the electrophoretic material 6 deposited on the electrode 9 corresponding to the light image can hide the colored porous layer 12 from sight, the device of FIG. 2, shows a visible image of the same color as the electrophoretic material 6 at the electrode 9. The suspension area where the electrophoretic material 6 deposited on the electrode does not completely hide the colored porous layer 12 shows a halftone consisting of a mixed gray color of the white electrophoretic material 6 and the black porous layer 12. When the polarities of the applied voltage are reversed in the above operation, the image area reproduced can show the same black color as the porous layer 12. In such a way, the color of the reproduced image can be reversed by reversing the polarities of the applied voltage.

It is also possible to use an electrophoretic suspension layer having a colored porous layer inserted in a colored suspending medium and at least one electrophoretic material suspended therein. Colored porous layer 12 in the present invention can be made from any sheet having pores therein. The side of the pores must be large enough to pass the particles of the electrophoretic material therethrough and small enough to hide the electrophoretic material from sight. Operable materials are a cloth or a mesh woven of natural or artificial fibers; a fibroid sheet having thousands of irregular pores; a thin plate with a plurality of tiny holes, and a sheet having granular material bound together with resin or an adhesive agent to form a large number of pores.

Figure 3:
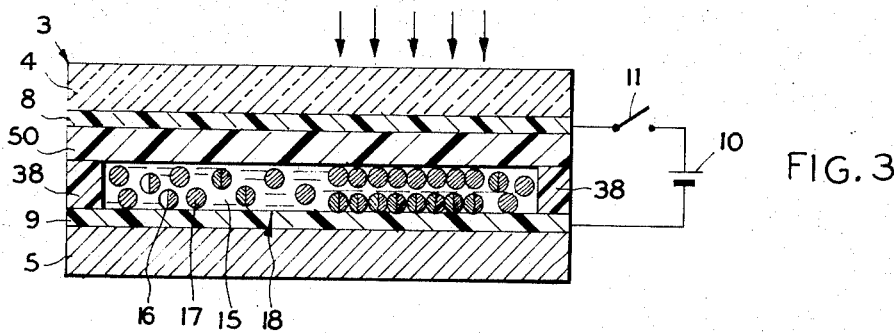

Referring to FIG. 3, wherein similar reference characters designate components similar to those of the foregoing figures, a suspending medium 15 which is colored or colorless includes at least two kinds of electrophoretic materials 16 and 17 in a finely divided powder form. Said two kinds of electrophoretic materials 16 and 17 are different from each other with respect to the charge polarity and the optical reflective property.

The device of FIG. 3, shows a color which is a mixture of the colors of said two kinds of electrophoretic materials 16 and 17 and suspending medium 15, at the electrode 9, before a D.C. electric field is applied to the electrophoretic suspension layer 18.

When a D.C. electric field is applied across the electrodes 8 and 9 during reduction of resistivity of said photoconductive layer 50 due to the irradiation of light image, said two kinds of electrophoretic materials 16 and 17 corresponding to the light image are caused to move electrophoretically in directions opposite to each other. One material, that with positive polarity moves toward a cathode 9 and is deposited on the cathode 9 and the other, that with negative polarity, moves to and is deposited on the surface of the photoconductive layer 50 and the device shows a spatial distribution of electrophoretic materials 16 and 17 as shown in FIG. 3. When one of said electrophoretic material 16 with positive polarity is, for example, yellow and the other of said electrophoretic material 17 with negative polarity is, for example, cyan, the image area reproduced at the electrode 9 is yellow in color.

The background area, of the reproduced image, corresponding to the area of said photoconductive layer 50 where the light image is not projected, is not subjected to an electric field effective for movement of the electrophoretic materials 16 and 17 and shows a mixed green color due to the uniform spatial distribution of the yellow material 16 and the cyan material 17 when the suspending medium 15 is colorless. A reversal of the polarities of the applied voltage can reproduce a cyan image corresponding to the light image at the electrode 9.

Figure 4:
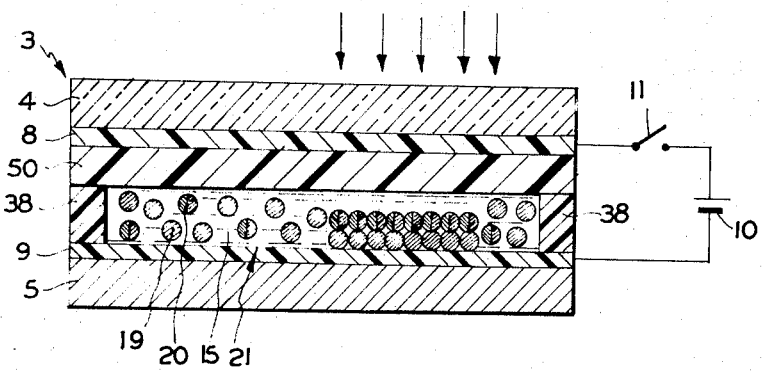

Referring to FIG. 4 wherein similar reference characters designate components similar to those of the foregoing figures, a suspending medium 15 which is colored or colorless includes at least two kinds of electrophoretic materials 19 and 20 in a finely divided powder form. Said two kinds of electrophoretic materials 19 and 20 have the same charge polarity but have different electrophoretic mobilities and optical reflective properties from each other. The device of FIG. 4 originally shows, at electrode 9, a color which is a mixture of the colors of said two kinds of electrophoretic materials 19 and 20 and suspending medium 15. When said two kinds of electrophoretic materials 19 and 20 are, for example, white and black, respectively and suspending medium 15 is colorless, the device is colored gray at the electrode 9. When a D.C. electric field is applied across the electrodes 8 and 9 during reduction of resistivity of said photoconductive layer 50 due to the irradiation of a light image, said two kinds of electrophoretic materials 19 and 20 corresponding to the light image are caused to move electrophoretically in the same direction.

When electrophoretic materials 19 and 20 are positively charged and the electrophoretic mobility of said electrophoretic material 19 is greater than that of said electrophoretic material 20, the electrophoretic material 19 moves faster under a D.C. electric field than the electrophoretic material 20 does in said suspension layer 21; and the amount of the former deposited nearest the cathode 9 is larger than the amount of the latter. Thus the device shows a spatial distribution of the electrophoretic materials 19 and 20 as shown in FIG. 4. Therefore, the device has a visible image of a white color reproduced at the electrode 9. The color characteristic of the image area reproduced at the electrode 9 can be reversed by reversing the polarities of the applied voltage.

As is apparent in the foregoing descriptions and figures, the device of the present invention described in FIGS. 1, 2, 3 and 4 can reproduce a visible image corresponding to a light image projected on a photoconductive layer. The reproduced visible image is made up from an electrophoretic suspension layer. The light image projected on the photoconductive layer produces an electric field image corresponding to the light image across the electrophoretic suspension layer. The reflective color characteristic of the suspension layer can be changed by an electric field applied thereto. This is because the spatial distribution of the electrophoretic material in the suspending medium is changed by application of an electric field and a layer of at least one electrophoretic material deposited on an electrode or a photoconductive layer hides, or is hidden by, the residual colored component in the suspension such as the colored suspending medium, a colored porous layer or the other electrophoretic material. Thus, the suspension layer reveals a visible image corresponding to the light image.

The aforesaid electrophoretic suspension layer can be prepared by using any of the well-known stable colloidal particles suspended in a suspending medium such as colloidal graphite suspended in mineral oil. In addition to colloidal particles, one can use, as an electrophoretic material, finely divided particles such as titanium dioxide, zinc oxide, carbon black, phthalocyanine blue, phthalocyanine green, hansa yellow or watchung red suspended stably in a suspending medium such as kerosene, trichlorotrifluoroethane, isopropyl alcohol or olive oil. An electrophoretic material suspended in a suspending medium usually has a positive or negative charge depending upon the properties of the electrophoretic material and the suspending medium.

The electrophoretic suspension layer 2 or 14 of FIG. 1 or 2 can consist of only one electrophoretic material with positive or negative polarities suspended in a suspending medium. The electrophoretic suspension layer 18 or 21 of FIG. 3 or 4 must include at least two kinds of electrophoretic materials suspended in a suspending medium. Those two kinds of electrophoretic materials must have different optical reflective properties and different charge polarities or electrophoretic mobilities. Therefore, in preparing either electrophoretic suspension layer 18 or 21, at least one pair of electrophoretic materials having suitable optical reflective properties and electrophoretic properties must be selectively suspended in a suspending medium.

The average particle size of finely divided particles which will be operable are dependent upon the stability and the hiding power of the resultant electrophoretic suspension layer and usually range from $0.1\mu$ to about $50\mu$.

It is preferred to add any suitable and available charge control agent, dispersion agent or stabilizing agent such as surface active agent, metallic soap, resin or oil to the electrophoretic suspension layer to provide a stable suspension layer and to control the electrophoretic property of the electrophoretic material in accordance with the prior art well known in colloidal chemistry. In order to control the charge property of finely divided particles suspended in a suspending medium, it is preferred to use particles coated with resin which is not soluble in or only partially soluble in the suspending medium. When the coated resin is partially soluble in the suspending medium, it can also act as a fixing agent for a reproduced image.

It is possible to use, as a suspending medium, any available and suitable liquid which is inert to the electrophoretic material, the housing, the electrodes and the photoconductive layer. To produce a temporary display, one can use a suspending medium in a liquid state at room temperature, i.e., from 0° C. to 35° C.

To produce a permanent display, that is, a hard copy, one can use a suspending medium which is in a solid state at room temperature and in a liquid state above room temperature, i.e. above 35° C. Suspending media which are operable for this purpose are, for example, thermoplastic resin or waxes such as beeswax, vegetable wax, paraffin or synthetic wax. When using such suspending media, the device according to the present invention must be kept at a higher temperature than room temperature for producing the display or recording.

After the device is subjected to a D.C. electric field and a light image at a higher temperature to vary electrophoretically the spatial distribution of said electrophoretic material, it is cooled to room temperature, to produce a permanent display. If it is desired to erase the permanent display, the device is subjected to an A.C. or D.C. electric field at the higher temperature. A suspending medium which is originally in a liquid state but can be hardened by, for example, heating, oxidation, UV radiation or reaction with hardener is also useful for producing a hard copy.

For example, when the suspending medium consists of a thermosetting material which is in a liquid state at room temperature, one can produce a permanent display by heating the suspending medium after the electrophoretic movement of the electrophoretic material in an image form.

Thermosetting materials which are operable as suspending media are, for example, drying oil such as linseed oil, soya oil or tung oil. When a liquid suspending medium includes a binder such as polystyrol, vinyl acetate resin or linseed oil which fixes the electrophoretic material in a finely divided powder form, one can obtain a hard copy having a permanently visible image reproduced thereon by evaporating or exhausting the residual liquid suspending medium. The evaporation or exhaustion of the suspending medium can be achieved by, for example, evacuating the housing including electrophoretic material in the suspending medium through an outlet formed, for example, in the housing wall.

In the embodiments described above, two electrodes 8 and 9 are positioned at the inner surfaces of housing walls 4 and 5. However, it is possible to realize a display and/or recording device according to the invention by causing the two electrodes positioned at the outer surfaces of the housing walls. In a particular case an electrode opposite to the light source can be replaced by a corona discharge electrode remote from the surface of the housing wall.

Figure 5:
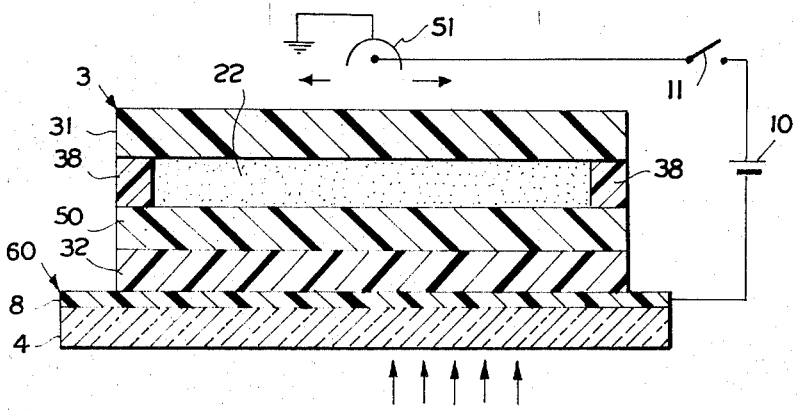
FIGS. 5–10 are cross sectional views of other embodiments of this invention.

Referring to FIG. 5 in which similar reference characters designate components similar to those of foregoing figures, a suspension layer 22 can be made of any possible electrophoretic suspension layer such as a suspension layer 2, 14, 18, or 21 of FIGS. 1, 2, 3, 4. The suspension layer 22 includes a dispersion of at least one electrophoretic material suspended in a suspending medium and is enclosed in a housing 3. An electrode 60 exposed to a light image consists of a plate 4 having an electrode 8 attached thereto transparent with respect to the light image and is positioned at the outer surface of housing wall 32 which is transparent to said light image. The housing wall 32 has a photoconductive layer 50 integrated at the inner surface thereof. Another major housing wall 31 is transparent with respect to visible light. The housing wall 31 or 32 is made from a sheet such as polyester, cellulose diacetate, cellulose triacetate, polyethylene or cellophane.

A high D.C. voltage is applied across the light transparent electrode 60 and a corona discharge electrode 51 remote from the housing wall 31 so as to charge the surface of the housing wall 31 with corona ions during the reduction of the electrical resistance of said photoconductive layer 50 due to irradiation of the light image.

The device of FIG. 5 can then reproduce a visible image on the housing wall 31 in a way similar to that described above. The reproduced image can be erased while the housing wall 31 is positively or negatively charged by means of a corona discharge electrode 51 during irradiation of light on entire surface of the photoconductive layer 50.

The device shown in FIG. 5 can be modified: with electrode 60 being replaced with another corona discharge means. One of the two corona discharge means discharges positive corona ions on one surface of the housing walls and another of the two corona discharge means discharges negative corona ions on another surface of the housing walls during reduction of electrical resistance of said photoconductive layer due to irradiation by the light image, whereby a visible image is reproduced.

Figure 6:
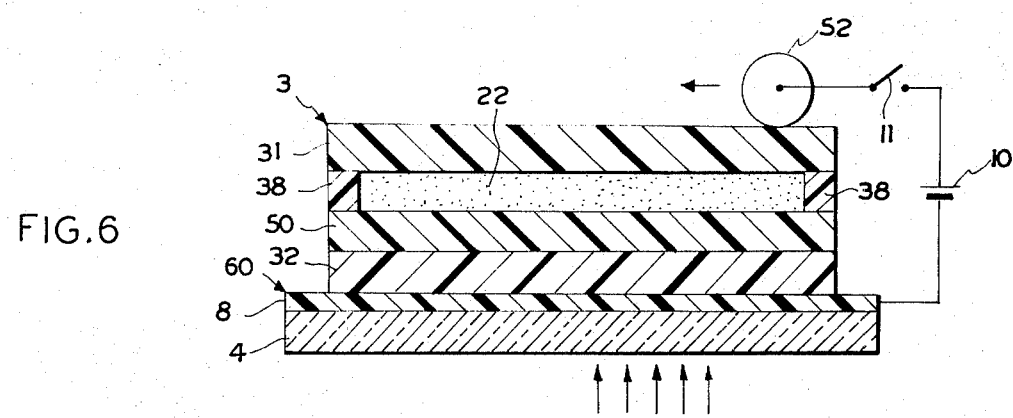

Referring to FIG. 6 in which similar reference characters designate components similar to those of foregoing figures, a roller electrode 52 in a high D.C. voltage rolls along the surface of the housing wall 31 so as to apply a D.C. electric field throughout said electrophoretic suspension layer 22 and said photoconductive layer 50 during the reduction of electrical resistance of said photoconductive layer 50 due to irradiation by the light image. This device can also reproduce a visible image similarly to the device of FIG. 5. The reproduced image can be erased when the roller electrode 52 with a high D.C. or A.C. voltage rolls along the surface of the housing wall 31 while light irradiates the entire housing wall 32.

When a suspension layer 22 is in a solid state at room temperature and is soft enough to cause the electrophoretic material to move electrophoretically at high temperature, it is not necessary to use a housing 3 for enclosing the suspension layer 22.

Figure 7:
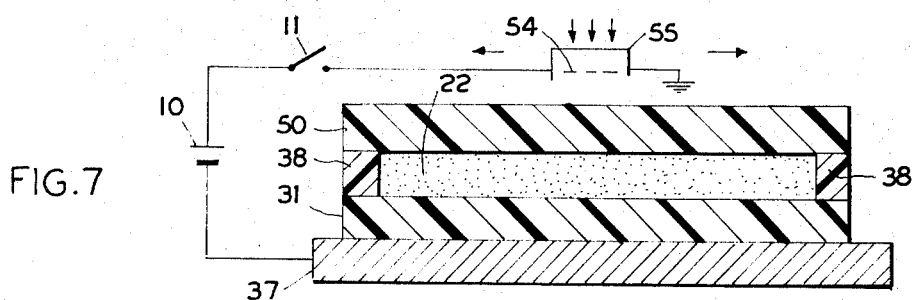

Referring to FIG. 7 in which similar reference characters designate components similar to those of foregoing figures, a visible light transparent sheet 31 has a suspension layer 22 in a solid state at room temperature superposed thereon.

A photoconductive layer 50 is superposed on said suspension layer 22. The three layered sheet on an electrode plate 37 is heated and is charged by a corona discharge means 54 which can be scanned over the whole of said photoconductive layer 50 so as to apply an electric field throughout said suspension layer 22 and said photoconductive layer 50 while said photoconductive layer 50 is being exposed to a light image through a window 55. When said three layered sheet is heated, said suspension layer 22 becomes soft enough to allow the electrophoretic material suspended therein to move electrophoretically. A reproduced image can be seen on the transparent sheet 31 and can be fixed permanently by cooling the three layered sheet.

Figure 8:
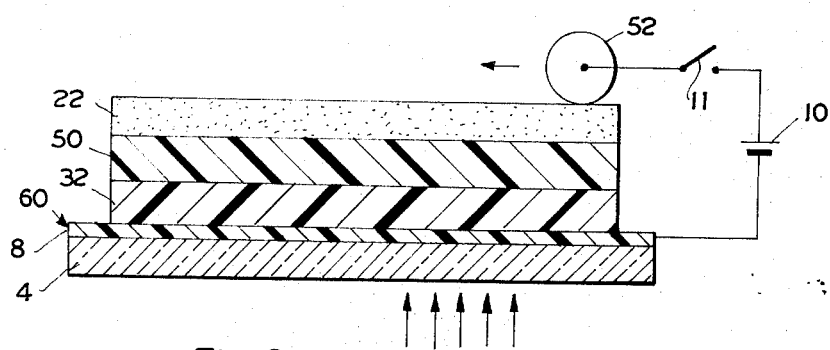

Referring to FIG. 8 in which similar reference characters designate components similar to those of foregoing figures, a light transparent sheet 32 has a photoconductive layer 50 superposed thereon. A suspension layer 22 is superposed on said photoconductive layer 50. A suspension layer 22 is soft enough to cause electrophoretic material to move electrophoretically at room temperature but is hardened above room temperature by heat, or a suspension layer 22 is in solid state at room temperature but can be soft enough, by application of heat or solvent, to cause the electrophoretic material to move electrophoretically. The three layered sheet is placed on a light transparent electrode 60. A roller electrode 52 in a high D.C. voltage rolls along the surface of the suspension layer 22 during the reduction of electrical resistance of said photoconductive layer 50 due to irradiation by the light image, during the soft state of said electrophoretic suspension layer 22 established if necessary, by application of heat or a solvent.

A visible image is reproduced on the suspension layer 22 and can be fixed permanently by heating or cooling the suspension layer 22 or by evaporating the solvent, dependent upon the original property of the suspension layer 22.

In the display and/or recording sheets described in FIGS. 5, 6, 7, and 8, electrode 37 or 60 can be replaced by a transparent electrode attached to an inner or outer surface of the housing wall or sheet 32 in FIGS. 5, 6 or 8 or the sheet 31 in FIG. 7.

In the present invention, the photoconductive layer 50 can be transparent with respect to visible light. An operable visible light transparent photoconductor is poly-N-vinylcarbazol and its derivatives. When the photoconductive layer 50, light transparent housing wall 4 and light transparent electrode 8 are all transparent with respect to visible light in the foregoing FIG. 1–FIG. 4, one can see another visible image at the electrode 8 in addition to one visible image at the electrode 9. Both visible images are reproduced simultaneously in a similar way as described in the foregoing descriptions and figures. The two visible images reproduced simultaneously at both electrodes are different in color. When one is a positive image, the other is a negative image. In such a device including a visible light transparent photoconductive layer, one can prepare a device which displays a visible image only at one side by replacing the housing wall 5 having an electrode 9 thereon with an opaque electrode such as a metal plate. In the same way, when the photoconductive layer 50 and housing wall or sheet 32 are transparent with respect to visible light in FIGS. 5, 6, or 8, one can see another visible image at the housing wall 32. A device of this type is shown in FIG. 9.

Figure 9:
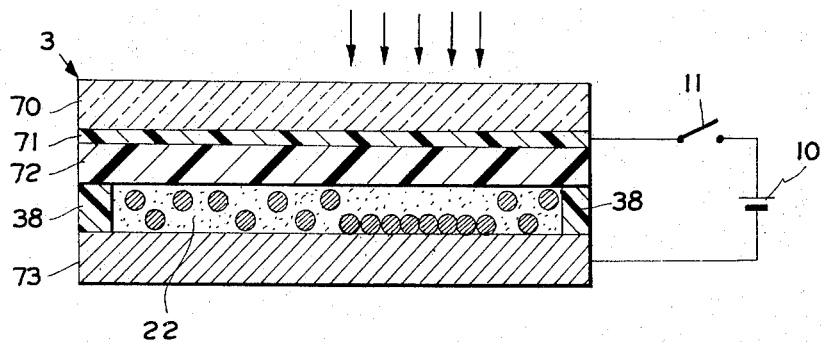

Referring to FIG. 9, wherein similar reference characters designate components similar to those of foregoing figures, a suspension layer 22 is enclosed in a housing 3 having two opposite major housing walls 70 and 73. The housing wall 70 and an electrode 71 attached thereto are transparent with respect to light image and visible light. The electrode 71 has a photoconductive layer 72 attached thereon which is transparent with respect to visible light. Another housing wall 73 is made from, for example, a metal plate. A light image is projected, through the housing wall 70, on the photoconductive layer 72 and a D.C. voltage is applied between the electrodes 71 and 73 in a similar manner as described above, whereby one can observe a reproduced image at the housing wall 70.

Figure 10:
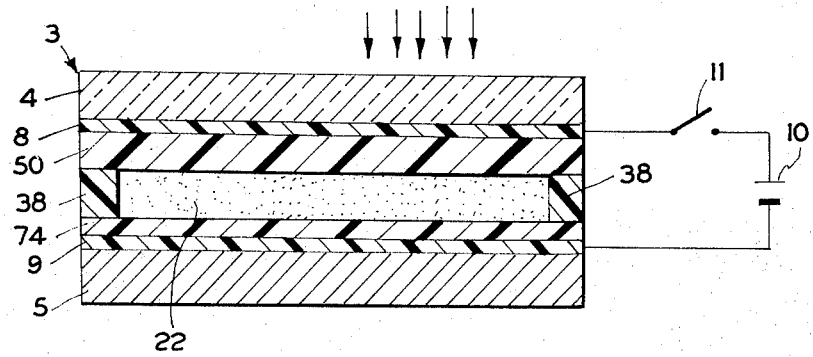

When the electrode 9 in FIGS. 1–4 is coated with a visible light transparent insulating layer which is not soluble in the suspending medium and is in contact with the suspension layer, the insulating layer makes it easy to remove the electrophoretic material deposited on the surface insulating layer in order to display a new image by subjecting the suspension layer to a D.C. or A.C. electric field. A device of this type is shown in FIG. 10. Referring to FIG. 10, wherein similar reference characters designate components similar to those of foregoing figures, the electrode 9 is coated with a visible light transparent insulating layer 74. The layer 74, is, for example, vinyl acetate resin, polystyrol or gelatin. It is preferred for a low voltage operation that the resistance of the insulating layer be lower than that of the suspension layer.

One can use any available and possible apparatus as means for applying a D.C. electric field throughout the suspension layer and the photoconductive layer between two electrodes. For example, a pulse generator, a battery and any other D.C. sources can be used. In order to erase the displayed image, an A.C. source can also be used.

The amount of electrophoretic material in the suspending medium or the thickness of the electrophoretic suspension layer is selected depending upon the hiding power or electrophoretic property of the electrophoretic material, the density or contrast range of the reproduced image required in the device, feasibility of the voltage source and so on. The value of the hiding power of pigment particles available commercially is helpful in preparing the suspension. For example, the values of the hiding powers of titanium dioxide particles and acetylene black particles are about 130 cm.$^2$ and 25,400 cm.$^2$, respectively per gm. in the conventional suspending liquid such as linseed oil. Therefore, titanium dioxide particles of at least 1 g. and acetylene black particles of at least 5 mg. are required, respectively, so as to reproduce an image of high contrast on the image display device having an area of 130 cm.$^2$. When the thickness of suspension layer is to be 1 mm., said amount of each pigment particles must be introduced into 13 ml. of a suspending medium.

Since the display device of the present invention is the reflective type, the suspension layer must be opaque in order to make a great color change. The thicker the suspension layer, the higher the applied voltage which is usually required. The thinner the suspension layer, the denser the concentration of the electrophoretic material must be to make a great color change. The thickness of the suspension layer is usually from a few microns to a few mm. Electrical resistance of the suspension layer is decided upon the dark and light electrical resistance of the photoconductive layer.

EXAMPLE

A mixture of particles as described in Table 1 is combined with 200 ml. of olive oil. The mixture in olive oil is well blended in a ball mill to produce a gray paste having white and black particles suspended in olive oil. In this gray paste, titanium dioxide particles are positively charged and black toner particles are negatively charged in the olive oil.

TABLE 1

Titanium dioxide particles; 15 g. (a brand R–680 commercially available from the Ishihara Industrial Company in Japan, of rutile type having a particle size 0.15–0.3$\mu$)

Black toner particles; 15 g. (Type-10 manufactured for electrophotography by the Rank Xerox Company in England).

Brominated poly-N-vinylcarbazol as a main photosensitive organic compound, in addition a small amount of sensitizer and plasticizer are dissolved in a solvent to produce a photosensitive solution. The solution is coated on the transparent electrode (electrode 8) of EC glass (EC glass is an electrical conductive glass which consists of a transparent glass plate having a transparent SnO$_2$ electrode thereon.) The organic photoconductive layer on the EC glass is about 10$\mu$ thick and is transparent with respect to visible light.

Said gray paste is interposed between said photoconductive layer on the electrode 8 and another EC glass electrode (electrode 9) so as to form an electrophoretic suspension layer of a thickness of 25$\mu$ by using a 25$\mu$ thick frame as shown in FIG. 3. The side faces of said sandwich cell are made liquid tight by a adhesive agent (Araldite commercially available from the Ciba Ltd. in Switzerland) while each electrode is left partially exposed for connection of leads.

A D.C. voltage of 300 v. is applied for 3 seconds between electrode 8 as an anode and electrode 9 as a cathode simultaneously when black and white positive light image projected through a projector with an incandescent light source projected, through electrode 8, on said organic photoconductive layer for 3 seconds.

The sandwich cell shows a reproduced positive image at the electrode 9 and a reproduced negative image at the electrode 8, under illumination of white light. The sandwich cell can memorize the reproduced images even after removal of the applied voltage. The reproduced images are erased by applying an A.C. voltage of 300 v. for a few seconds between the two electrodes while white light is being projected uniformly on the photoconductive layer.

The application of a reverse D.C. voltage between the two electrodes during irradiation of black and white negative image on the photoconductive layer reproduces a positive image at the electrodes 8 and a negative image at the electrode 9.

In order to see the reproduced image at the electrode 9 as a real image in right and left, input light image reversed in right and left must be projected, through electrode 8, on the photoconductive layer.

In the above operation, application of 300 v. D.C. below 3 seconds reproduces an image of lower density on said sandwich cell. Application of 300 v. D.C. over 3 seconds reproduces an image of higher density but of lower contrast.

The favorable length of time of voltage application for reproducing an image of high quality depends upon the strengths of the applied voltage and projected light image.

What is claimed is:

1. An electrophoretic light image display and/or recording device comprising an electrophoretic suspension layer inserted between two electrodes one of which has a photoconductive layer coupled thereto and faced to said electrophoretic suspension layer, means for applying an electric field between said two electrodes, and means for irradiating light on said photoconductive layer so as to reduce the resistivity of said photoconductive layer, said electrophoretic suspension layer being selected from the group consisting of a suspension including at least one electrophoretic material suspended in a colored suspending medium, a suspension including at least one electrophoretic material suspended in a suspending medium further having a porous layer therein, a suspension including at least two electrophoretic materials suspended in a suspending medium, one of said at least two electrophoretic materials differing in charge polarity and optical reflective property from one another, and a suspension including at least two electrophoretic materials suspended in a suspending medium, one of said at least two electrophoretic materials differing in electrophoretic mobility and optical reflective property from one another, the optical reflective property of said electrophoretic suspension layer being changeable with electrophoretic movement of said electrophoretic material upon application of said electric field during the reduction of the resistivity of said photoconductive layer.

2. An electrophoretic light image display and/or recording device defined by claim 1 wherein said one of two electrodes is transparent with respect to said irradiated light and another of said two electrodes is transparent with respect to visible light.

3. An electrophoretic light image display and/or recording device defined by claim 1 wherein said one of two electrodes is transparent with respect to said irradiated light and visible light, said photoconductive layer is transparent with respect to visible light.

4. An electrophoretic light image display and/or recording device defined by claim 2, wherein said electrophoretic suspension layer is enclosed in a housing provided with two opposite major housing walls one of which is transparent with respect to said irradiated light and has said one electrode with said photoconductive layer attached therein and another of which is transparent with respect to visible light and has said another electrode attached therein.

5. An electrophoretic light image display and/or recording device defined by claim 3, wherein said electrophoretic suspension layer is enclosed in a housing provided with two opposite major housing walls one of which is transparent with respect to said irradiated light and visible light and has said one electrode with said photoconductive layer attached therein.

6. An electrophoretic light image display and/or recording device defined by claim 1, wherein said suspension medium is colored.

7. An electrophoretic light image display and/or recording device defined by claim 1, wherein said suspending medium has a porous layer inserted therein.

8. An electrophoretic light image display and/or recording device defined by claim 1, wherein there are at least two electrophoretic materials, one of which differs in the charge polarity and the optical reflective property from the other.

9. An electrophoretic light image display and/or recording device defined by claim 1, wherein there are at least two electrophoretic materials, one of which differs in the electrophoretic mobility and the optical reflective property from the other.

10. An electrophoretic light image display and/or recording device defined by claim 1, wherein said suspending medium is a hardenable material.

11. An electrophoretic light image display and/or recording device defined by claim 1, wherein said suspension layer is in solid state at room temperature but becomes soft enough for electrophoretic movement of said electrophoretic material above room temperature.

12. An electrophoretic light image display and/or recording device defined by claim 1, wherein said suspension layer further contains a binder for said electrophoretic material, which binder is at least partially soluble in said suspending medium.

13. An electrophoretic light image display and/or recording device defined by claim 1, wherein said means for applying an electric field includes means for controlling said electric field with respect to at least one property selected from the group consisting of strength, length of time of application and polarity.

14. An electrophoretic light image display and/or recording device defined by claim 1, wherein at least one of said two electrodes is a roller electrode.

15. An electrophoretic light image display and/or recording device defined by claim 1, wherein at least one of said two electrodes is a corona discharge electrode.

16. An electrophoretic light image display and/or recording device defined by claim 4 wherein said another electrode is coated with a visible light transparent insulating layer which is in contact with said suspension layer.

References Cited

UNITED STATES PATENTS

| | | | |
|---|---|---|---|
| 3,102,026 | 8/1963 | Metcalf et al. | 96—1 XR |
| 3,145,156 | 8/1964 | Oster | 204—299 XR |
| 3,244,083 | 4/1966 | Gundlach | 96—1 XR |
| 3,268,331 | 8/1966 | Harper | 96—1 |
| 3,271,145 | 9/1966 | Robinson | 96—1 |
| 3,384,565 | 5/1968 | Tulagin et al. | 204—181 |
| 3,477,934 | 11/1969 | Carreira et al. | 204—300 XR |
| 3,510,419 | 5/1970 | Carreira et al. | 204—181 |
| 3,511,651 | 5/1970 | Rosenberg | 204—180 XR |

JOHN H. MACK, Primary Examiner

A. C. PRESCOTT, Assistant Examiner

U.S. Cl. X.R.

204—180 R, 181

Notice of Adverse Decision in Interference

In Interference No. 99,028, involving Patent No. 3,684,683, I. Ota, ELECTROPHORETIC LIGHT IMAGE REPRODUCTION DEVICE, final judgment adverse to the patentee was rendered Oct. 28, 1976, as to claims 1 and 13.

[*Official Gazette February 1, 1977.*]